United States Patent
Pawar et al.

(10) Patent No.: US 10,021,693 B1
(45) Date of Patent: Jul. 10, 2018

(54) METHOD AND SYSTEM FOR INVOKING UPLINK COVERAGE BOOSTING IN RESPONSE TO THRESHOLD LOW POWER HEADROOM AND THRESHOLD LOW DOWNLINK RECEIVE SIGNAL STRENGTH

(71) Applicant: Sprint Spectrum L.P., Overland Park, KS (US)

(72) Inventors: Hemanth B. Pawar, Brambleton, VA (US); Shilpa K. Srinivas, Brambleton, VA (US); Krishna Sitaram, Chantilly, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 0 days.

(21) Appl. No.: 15/688,259

(22) Filed: Aug. 28, 2017

(51) Int. Cl.
*H04W 52/16* (2009.01)
*H04W 72/04* (2009.01)
*H04W 52/02* (2009.01)
*H04L 5/00* (2006.01)
*H04L 1/00* (2006.01)

(52) U.S. Cl.
CPC ... *H04W 72/0453* (2013.01); *H04W 52/0206* (2013.01); *H04L 1/0003* (2013.01); *H04L 5/0007* (2013.01); *H04L 5/0021* (2013.01); *H04W 52/0235* (2013.01)

(58) Field of Classification Search
None
See application file for complete search history.

(56) References Cited

U.S. PATENT DOCUMENTS

| | | | | |
|---|---|---|---|---|
| 9,357,546 | B1 * | 5/2016 | Marupaduga | H04W 72/0446 |
| 2011/0189997 | A1 * | 8/2011 | Tiwari | H04W 36/00 |
| | | | | 455/443 |
| 2012/0002568 | A1 * | 1/2012 | Tiirola | H04L 1/0026 |
| | | | | 370/252 |
| 2013/0252660 | A1 * | 9/2013 | Bach | H04W 52/0206 |
| | | | | 455/525 |
| 2013/0310077 | A1 * | 11/2013 | Siomina | H04W 4/02 |
| | | | | 455/456.2 |
| 2014/0045543 | A1 * | 2/2014 | Ishii | H04W 52/146 |
| | | | | 455/522 |

(Continued)

OTHER PUBLICATIONS

"Nokia Academy, RA4140 FL16 Feature Delta, Radio Resource Management and Telecom Features," e.g., PDF pp. 127-141 (2016).

*Primary Examiner* — Edan Orgad
*Assistant Examiner* — Emmanuel Maglo

(57) ABSTRACT

A base station will determine both that a served device's power headroom is threshold low and that the device's downlink receive signal strength is threshold low. In response to at least determining both that the device's power headroom is threshold low and that the device's downlink receive signal strength is threshold low, the base station will then begin applying an uplink coverage boosting process for the device, including limiting or reducing the number of frequency blocks that the base station allocates to the device for uplink transmission per transmission time interval, to help increase the device's per-frequency-block transmission power and thus the device's uplink communication quality. This could be usefully carried out with respect to voice over Long Term Evolution (VoLTE) uplink coverage boosting (VUCB) for instance, to help improve voice communication quality.

20 Claims, 3 Drawing Sheets

(56) References Cited

U.S. PATENT DOCUMENTS

| | | | |
|---|---|---|---|
| 2014/0185526 A1* | 7/2014 | Aksu | H04W 4/001 370/328 |
| 2016/0112961 A1* | 4/2016 | Zhang | H04W 52/34 455/522 |
| 2016/0174224 A1* | 6/2016 | Tang | H04W 72/0446 370/336 |
| 2017/0041460 A1* | 2/2017 | Seward | H04M 3/42008 |
| 2017/0055231 A1* | 2/2017 | Cook | H04W 52/0229 |

* cited by examiner

METHOD AND SYSTEM FOR INVOKING UPLINK COVERAGE BOOSTING IN RESPONSE TO THRESHOLD LOW POWER HEADROOM AND THRESHOLD LOW DOWNLINK RECEIVE SIGNAL STRENGTH

BACKGROUND

A typical wireless communication system includes a number of base stations each providing coverage in which to serve user equipment devices (UEs) such as cell phones, tablet computers, tracking devices, embedded wireless modules, and other wirelessly equipped devices. In turn, each base station may sit as a node on a core access network that includes entities such as a network controller and a gateway system that provides connectivity with an external transport network such as the Internet. With this arrangement, a UE within coverage of the system could engage in air interface communication with a base station and may thereby communicate via the base station with various remote network entities or with other WCDs served by the base station.

Such a system could operate in accordance with a particular air interface protocol, examples of which include, without limitation, Long Term Evolution (LTE) (using Orthogonal Frequency Division Multiple Access (OFDMA) and Single Carrier Frequency Division Multiple Access (SC-FDMA), Code Division Multiple Access (CDMA) (e.g., 1xRTT and 1xEV-DO), Global System for Mobile Communications (GSM), IEEE 802.11 (WIFI), BLUETOOTH, and others.

In accordance with the air interface protocol, a base station could provide service on one or more carriers, each spanning particular radio-frequency (RF) spectrum on which communications can flow wirelessly between the base station and UEs. Such a carrier could be structured to provide a downlink for carrying communications from the base station to UEs and an uplink for carrying communications from UEs to the base station. For instance, the carrier could be frequency division duplex (FDD), with separate frequency bandwidth provided respectively for downlink and uplink communication, or time division duplex (TDD), with a single frequency bandwidth being time division multiplexed between downlink and uplink use. Representative frequency bandwidths could be 1.4 MHz, 3 MHz, 5 MHz, 10 MHz, 15 MHz, or 20 MHz, among other possibilities.

Through modulation or other means on the carrier, the downlink and uplink could then be structured in accordance with the air interface protocol to define particular air interface resources for carrying communications between the base station and the UEs, and the base station could be configured to coordinate use of at least some of those resources as necessary.

Under LTE, for instance, the air interface is divided over time into a continuum of 10-millisecond frames, each of which is then further divided into ten 1-millisecond subframes or transmission time intervals (TTIs). In each TTI, the carrier bandwidth is then divided into 180-kHz-wide frequency blocks, referred to as physical resource blocks (PRBs), that can be modulated to carry data between the base station and UEs. And the base station is configured to allocate those PRBs for use to carry data on an as-needed basis. For instance, when the base station has data to send to a UE, the base station could allocate certain PRBs of a TTI on the downlink to carry that data and could transmit the data to the UE in those allocated PRBs of the TTI. And when a UE has data to send to the base station, the UE could send a scheduling request to the base station, the base station could allocate certain PRBs of an upcoming TTI on the uplink to carry the data, and the UE could then transmit the data to the base station in the allocated PRBs of that TTI.

More particularly, under LTE, each PRB is divided into an array of resource elements that could carry data communications using an applicable modulation and coding scheme (MCS) typically selected based on an evaluation of channel conditions between the base station and the UE.

The MCS could define a coding scheme for encoding the data, including adding redundancy bits to the underlying data as appropriate, to produce an encoded data set, and a modulation scheme that establishes how the bits of the encoded data set will then be physically modulated onto air-interface resource elements and ultimately how many bits each resource element will carry and thus how many bits in total each PRB could carry. LTE supports a range of MCSs ranging from low-order (with low encoding rate and with each resource element representing a low number of bits) to high-order (with high encoding rate and with each resource element representing a high number of bits). Further, LTE typically provides a mapping between channel conditions (e.g., UE-reported channel quality, per a channel quality indicator (CQI)) and applicable MCS.

Thus, when a base station is serving a UE and there is a quantity of data to be communicated downlink or uplink between the base station and the UE, the base station could determine the channel conditions between the base station and the UE (e.g., based on UE-reported channel quality) and could then select an appropriate MCS to use for the communication. Based on that MCS and the quantity of data to be communicated between the base station and the UE, the base station could then determine how many PRBs would be necessary to carry the data. And the base station could then allocate that number of PRBs for use to carry the data, allowing the communication to proceed accordingly.

This process could work for essentially any type of data to be communicated between the base station and the UE. By way of example, if the UE is engaged in a voice over Internet Protocol (VoIP) call, such as a voice over LTE (VoLTE) call, the UE could transmit and receive voice packets (carrying digitized voice data) periodically. For each such voice packet destined to the UE, the base station could determine the quantity of data defining the packet, the base station could determine an applicable MCS based on the UE's channel conditions, the base station could allocate a number of PRBs accordingly to carry the data, and the base station could transmit the data to the UE in the allocated PRBs. And likewise, for each such voice packet to be transmitted from the UE, the base station could determine the quantity of data defining the packet, the base station could determine an applicable MCS based on the UE's channel conditions, the base station could allocate a number of PRBs accordingly to carry the data, and the UE could transmit the data to the base station in the allocated PRBs.

OVERVIEW

When a UE is engaged in a VoIP call (e.g., a VoLTE call), quality of the voice communication between a user of the UE and another party to the call is important. Such voice quality could be measured as a Mean Opinion Score, which could be estimated through digital speech signal analysis using a technique such as Perceptual Objective Listening Quality Assessment (POLQA). In general, it is desirable to have a high Mean Opinion Score.

When a UE is located at the edge of coverage of its serving base station, uplink voice quality from the UE could suffer. To help address this issue, the base station serving the UE could be configured to detect that the UE is in such a state, and the base station could responsively apply one or more techniques to help improve voice quality.

One technique to help improve voice quality is TTI-bundling. With TTI-bundling, the UE automatically repeatedly transmits given data in multiple consecutive TTIs in an effort to help ensure successful receipt of the data by the base station. For instance, the UE could transmit the data with various different redundancy information respectively in each of the consecutive TTIs, with the varying redundancy information cooperatively helping the base station to uncover the underlying data in the event that any one or more of the repeat transmissions is unsuccessful.

A base station could direct a UE to apply TTI-bundling in response to the base station detecting that the UE is in poor RF coverage of the base station. In particular, the base station could receive from the UE a report of downlink signal strength that the UE is receiving from the base station, and when the base station determines that the UE's reported downlink signal strength is low enough, the base station could respond by directing the UE to apply TTI-bundling, to help improve the UE's uplink communication and, hopefully, to help improve the UE's voice communication quality.

Another technique to help improve voice quality is uplink coverage boosting, which in the context of VoLTE could be referred to as VoLTE uplink coverage boosting (VUCB). With VUCB, the base station reduces the quantity of PRBs that the base station allocates to the UE for uplink transmission per TTI, so as to distribute the UE's limited transmission power among fewer PRBs at a time and thus increase the UE's transmission power per PRB. The base station could do this by distributing allocation of PRBs to the UE among multiple TTIs (e.g., rather than allocating ten PRBs to the UE in one TTI, the base station might allocate five PRBs to the UE in one TTI and five PRBs to the UE in a next TTI). Alternatively, the base station could do this by increasing the order of MCS that the base station directs the UE to use (e.g., increasing the MCS to an order that is higher than what the UE's channel conditions would normally correlate with), so that the UE could send more data in total per PRB and would thus need fewer PRBs to send given data. The higher transmission power per PRB with this technique could help improve the UE's uplink communication and ultimately the UE's voice communication quality.

A base station could apply VUCB (or other such uplink coverage boosting) for a UE in response to the base station detecting that the UE is at the base station's coverage edge. For instance, the base station could use power-headroom reporting from the UE as a basis for triggering VUCB. In this regard, under LTE, a base station and UE could normally engage in a power control process by which the base station directs the UE to increase the UE's transmission power when the base station's uplink receive signal strength from the UE is threshold low. Further, the UE could be configured with a maximum transmission power level, and the UE could provide the base station with a power headroom report (PHR) that indicates the difference between the UE's maximum transmission power and the UE's currently set transmission power (e.g., per the power control process). When the base station determines that the UE's power headroom is threshold low, that could indicate that the UE is at the cell edge, and the base station could then respond to the threshold low power headroom by beginning to apply VUCB for the UE, to help improve the UE's uplink communication and, hopefully, to help improve the UE's voice communication quality.

In practice, a base station could invoke for a UE both TTI-bundling and VUCB. Namely, if the UE's downlink receive signal strength is low enough to trigger TTI-bundling, the base station may direct the UE to apply TTI-bundling. And if the UE's reported power headroom is also low enough to trigger VUCB, the base station may also start applying VUCB for the UE.

However, the present inventors have determined that, depending on the UE's downlink receive signal strength, use of TTI-bundling in combination with VUCB is less beneficial in terms of Mean Opinion Score of the UE's voice communication than use of TTI-bundling alone. Namely, when the UE's downlink receive signal strength is above a threshold level (but still low enough to be poor coverage justifying use of TTI-bundling), the Mean Opinion Score of the UE's voice communication may be higher with use of just TTI-bundling than with use of TTI-bundling in combination with VUCB. Whereas, when the UE's downlink receive signal strength is below that threshold level, the Mean Opinion Score of the UE's voice communication may be higher with use of TTI-bundling in combination with VUCB than with use of just TTI-bundling (without VUCB).

Consequently, the inventors have determined that it would be useful to key the application of VUCB on a determination that both the UE's power headroom is threshold low and the UE's downlink receive signal strength is threshold low. When the UE's power headroom is threshold low enough to justify application of VUCB, at issue would then be whether the UE's downlink receive signal strength is also threshold low enough to justify application of VUCB. If so, then the base station could responsively begin to apply VUCB for the UE. Whereas, if not, then the base station could forgo application of VUCB for the UE (notwithstanding the low power headroom) unless and until the UE's downlink receive signal strength also becomes threshold low. In a representative implementation, the downlink receive signal strength threshold for this purpose could be on the order of −122 dBm. But other examples are possible as well.

These as well as other aspects, advantages, and alternatives will become apparent to those of ordinary skill in the art by reading the following detailed description, with reference where appropriate to the accompanying drawings. Further, it should be understood that the descriptions provided in this overview and below are intended to illustrate the invention by way of example only and not by way of limitation.

DETAILED DESCRIPTION

For purposes of illustration, the present disclosure will focus on implementation in the context of LTE and specifically with respect to a UE's VoLTE communication when served by a representative LTE base station, and application of VUCB. However, it should be understood that the disclosed principles could extend to apply in numerous other contexts, such as with respect to other air interface protocols, other types of air interface communication, and other forms of uplink coverage boosting. More generally, variations from the specific arrangements and processes described are possible. For instance, various described machines, connections, functions, and other elements could be added, omitted, distributed, re-located, re-ordered, combined, or changed in other ways. In addition, it will be understood that functions described herein as being performed by one or more entities may be implemented in various ways, such as by a processing unit executing software instructions for instance.

Figure 1:
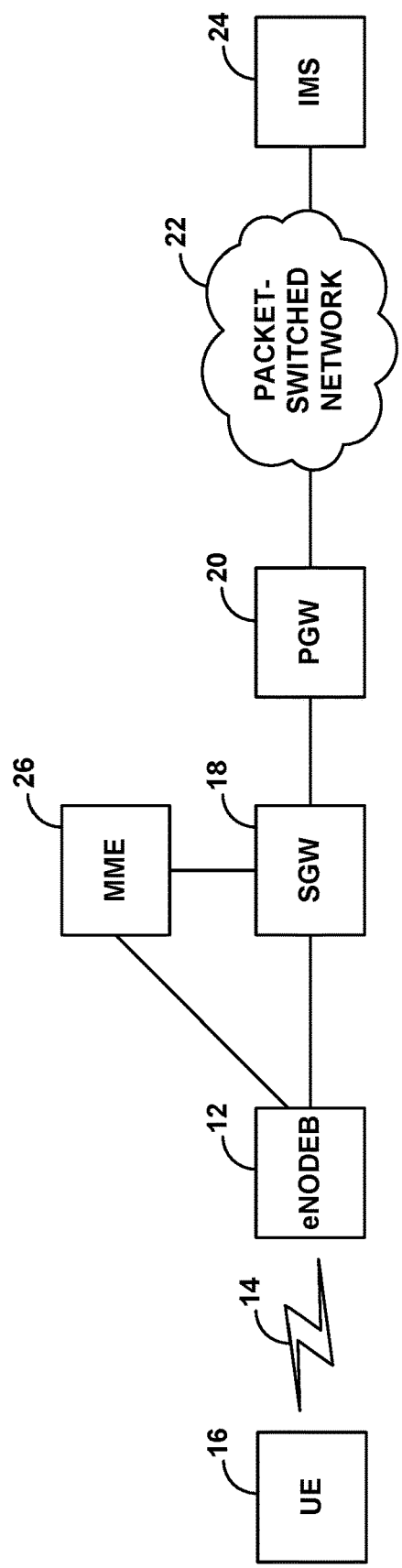
FIG. 1 is a simplified block diagram of a network arrangement in which aspects of the present disclosure can be implemented.

Referring to the drawings, as noted above, FIG. 1 is a simplified block diagram of an example network arrangement in which the disclosed features could be implemented. As shown, the network arrangement includes a representative LTE base station (evolved Node-B (eNodeB)) 12 that provides a coverage area 14 in which to serve UEs such as a representative UE 16. The eNodeB 12 then has an interface with a serving gateway (SGW) 18, which in turn has an interface with a packet-data network gateway (PGW) 20 that provides connectivity with a packet-switched network 22 such as the Internet. Shown sitting on the packet-switched network 22 is then an Internet Multimedia Subsystem (IMS) platform 24 that manages VoIP (e.g., VoLTE) calls. Further, as shown, the eNodeB 12 and SGW 18 each has a respective interface with a mobility management entity (MME) 26.

Coverage area 14 could define an air interface that operates on an FDD carrier, where the uplink and downlink each have a respective frequency bandwidth such as one of those noted above, with the air interface being divided over time on both the uplink and downlink into 1-ms TTIs. (Alternatively, the carrier could be TDD.)

A representative LTE downlink operates with OFDMA. The downlink air interface is divided over its frequency bandwidth into 15-kHz subcarriers, which are grouped into groups of twelve to define 180-kHz-wide downlink PRBs. Further, each TTI is divided over time into 14 symbol time segments each about 66.7 microseconds long. Thus, the downlink air interface defines an array of resource elements each occupying a 15-kHz subcarrier and spanning 66.7 microseconds. And each PRB encompasses 12×14=168 resource elements. As discussed above, these resource elements could then be modulated using a selected modulation scheme to carry bits of data from the eNodeB to the UE.

LTE reserves certain of these downlink resource elements for special use. For instance, the resource elements across the downlink bandwidth in the first one, two, or three symbol time segments per TTI are generally reserved to define a downlink control region for carrying control signaling, such as PRB scheduling directives, from the eNodeB to served UEs. And the resource elements in the remaining symbol time segments per TTI are generally reserved to define a shared channel region for carrying data in PRBs as scheduled by the eNodeB. Further, various resource elements distributed throughout the downlink bandwidth are reserved to carry a reference signal that UEs could measure to evaluate their downlink receive signal strength (e.g., reference signal receive power (RSRP) or receive strength signal indicator (RSSI)) from the eNodeB.

A representative LTE uplink operates with SC-FDMA. The uplink air interface, like the downlink air interface, is divided over its frequency bandwidth into 15-kHz subcarriers, which are grouped into groups of twelve to define 180-kHz-wide uplink PRBs, and each PRB is divided into resource elements that can be modulated using a selected modulation scheme to carry bits of data from the UE to the eNodeB. With SC-FDMA, however, each resource element may be effectively spread across the twelve subcarriers of the PRB rather than occupying just a single subcarrier, and may span a shorter duration of time within the PRB.

LTE also reserves certain of these uplink resource elements for special use. For instance, certain uplink PRBs as the low end and high end of the uplink frequency bandwidth in each TTI are generally reserved to define an uplink control region for carrying control signaling, such as scheduling requests and channel-quality, reports from the eNodeB to served UEs. And the remaining uplink PRBs are generally reserved to define an uplink shared channel region for carrying data in PRBs as scheduled by the eNodeB.

When a UE first enters into service within coverage of the eNodeB, the UE could engage in signaling with the eNodeB to establish a Radio Resource Control (RRC) connection and could then engage in attach signaling, via the eNodeB, with the MME 26 to attach or register for service. Through this process, the MME could authenticate the UE and could then engage in signaling to coordinate setup for the UE of one or more bearers extending between the UE and the PGW 20, to enable the UE to engage in packet-data communication on network 22. Assuming that the UE is VoLTE-capable, one such bearer could be an IMS signaling bearer through which the UE could then engage in signaling with the IMS platform 24 to set up an incoming or outgoing VoLTE call. Further, upon the UE setting up such as VoLTE call, the MME could also coordinate establishment for the UE of a guaranteed-bit-rate bearer for carrying the voice data of that call passing between the UE and the IMS platform.

In operation, when the UE is served by the eNodeB and has an RRC connection, the UE could from time to time (e.g., periodically and/or in response to certain triggers) provide the eNodeB with certain reports about the UE's state of service. For example, the UE could provide the eNodeB with reports of the UE's downlink receive signal strength from the eNodeB, the UE could provide the eNodeB with reports of the UE's power headroom, and the UE could provide the eNodeB with channel-quality reports (e.g., specifying a CQI that might be based on RSRP, UE capabilities and configuration), among possibly others. The UE could provide some or all of these reports to the eNodeB through transmission on the uplink control channel or in another manner.

Further, the UE and eNodeB could engage in a power control process as noted above. For instance, the eNodeB could regularly evaluate uplink receive signal strength from the UE and, upon determining that uplink receive signal strength is threshold low, could direct the UE to increment the UE's uplink transmission power.

In addition, as discussed above, the eNodeB could coordinate uplink transmission from the UE. For instance, when the UE has data to transmit, the UE could transmit a scheduling request to the eNodeB. The eNodeB could then map the UE's most recently reported channel quality to an applicable MCS, using a standard CQI-MCS mapping table, so as to determine what MCS the UE should use for the transmission. Given knowledge of the quantity of data that the UE has for transmission and given knowledge of the MCS, the eNodeB could then determine how many uplink PRBs would be needed to carry the UE's transmission (e.g., based on the coding rate indicating how many encoded data bits would be transmitted, and based on the modulation scheme indicating how many bits could be represented in total by each uplink PRB).

The eNodeB could then allocate the determined number of PRBs in an upcoming TTI for use by the UE with the determined MCS and could direct the UE to engage in the transmission accordingly. For instance, the eNodeB could transmit in an earlier downlink TTI to the UE a downlink control information (DCI) message that specifies the allocated PRBs in the upcoming TTI and that specifies the MCS to be used by the UE for the transmission. And in response to this directive, the UE could then engage in the transmission accordingly in the specified PRBs of the upcoming TTI.

For VoLTE communication, this process could apply with respect to voice packets, which might be transmitted periodically and might be a fixed size or variable in size. In some implementations with VoLTE or other situations, the eNodeB might use semi-persistent scheduling, in which the eNodeB provides the UE with a periodic-schedule for transmission in particular PRBs. Semi-persistent scheduling could help avoid the need for the UE to request allocation of resources in every instance.

As noted above, for VoLTE and perhaps in other situations, the eNodeB may be configured to invoke TTI-bundling when the UE's downlink receive signal strength is low enough (e.g., at least as low as a threshold level deemed low enough to justify application of TTI-bundling). The eNodeB could monitor the UE's reports of its downlink receive signal strength when the UE is engaged in a VoLTE call and, upon determining that the UE's reported downlink receive signal strength is low enough, the eNodeB could direct the UE to start using TTI-bundling for the UE's uplink communication. To do this, the eNodeB could include a TTI-bundling directive within the DCI message that the eNodeB sends to the UE to schedule the UE's uplink communication. This directive would cause the UE to repeat transmission of given data within a number of consecutive TTIs (with the number, a TTI-bundling-size or TTI-bundling-factor, perhaps further specified in the DCI message) in an effort to improve uplink quality of the data communication For VoLTE as noted above, this might help improve the Mean Opinion Score of the UE's voice communication.

Further, as also noted above, the eNodeB may be configured to invoke VUCB when the UE's power headroom is low enough (e.g., at least as low as a threshold level deemed low enough to justify application of VUCB). The eNodeB could monitor the UE's reports of its power headroom when the UE is engaged in a VoLTE call and, upon determining that the UE's reported power headroom is low enough, the eNodeB could start applying VUCB for the UE, reducing the number of uplink PRBs that the eNodeB allocates for use by the UE per TTI, to help thereby distribute the UE's transmission power over a fewer number of TTIs and thus increase or optimize the per-PRB transmission power.

For instance, as noted above, given the number of PRBs that the UE is to transmit in a given instance based on how much data the UE is to transmit and based on the UE's reported channel quality, the eNodeB could distribute that number of PRBs over multiple TTIs in a manner that reduces the per-TTI number of PRBs used by the UE. Alternatively or additionally, the eNodeB could increase the order of the UE's MCS to an order higher than that corresponding (per the standard CQI-MCS mapping table) with the UE's reported channel quality. That is, the eNodeB could transition from a mode in which the eNodeB directs the UE to use an MCS that correlates with the UE's reported CQI to a mode in which the eNodeB directs the UE to use a higher-order MCS.

As explained above, the inventors have determined that it may be better to apply just TTI-bundling, rather than applying a combination of TTI-bundling and VUCB, when the UE's downlink receive signal strength is low enough to justify TTI-bundling but is not lower than a particular threshold level (e.g., a threshold that is lower than the TTI-bundling threshold level). Consequently, the inventors have determined that it would be useful to key the application of VUCB not only to the UE having threshold low power headroom but also, in combination, to the UE having threshold low downlink receive signal strength. Here, the threshold downlink receive signal strength could thus be a threshold that is lower than that used to trigger TTI-bundling. For instance, an RSRP threshold for triggering TTI-bundling might be on the order of −117 dBm, whereas an RSRP threshold for triggering VUCB when power headroom is sufficiently low as well might be on the order of −122 dBm. Other examples, not limited to these values, could be possible as well.

Thus, in practice, the eNodeB could determine when the UE is operating in a state in which both the UE's downlink receive signal strength is threshold low and the UE's power headroom is threshold low. And in response to determining that the UE is operating in that state, the eNodeB could then begin applying VUCB for the UE. Further, in this process as noted above, the downlink receive signal strength threshold could optimally be a value that is lower (weaker downlink receive signal strength) than the downlink receive signal strength threshold that the eNodeB would apply for triggering TTI-bundling by the UE.

Figure 2:
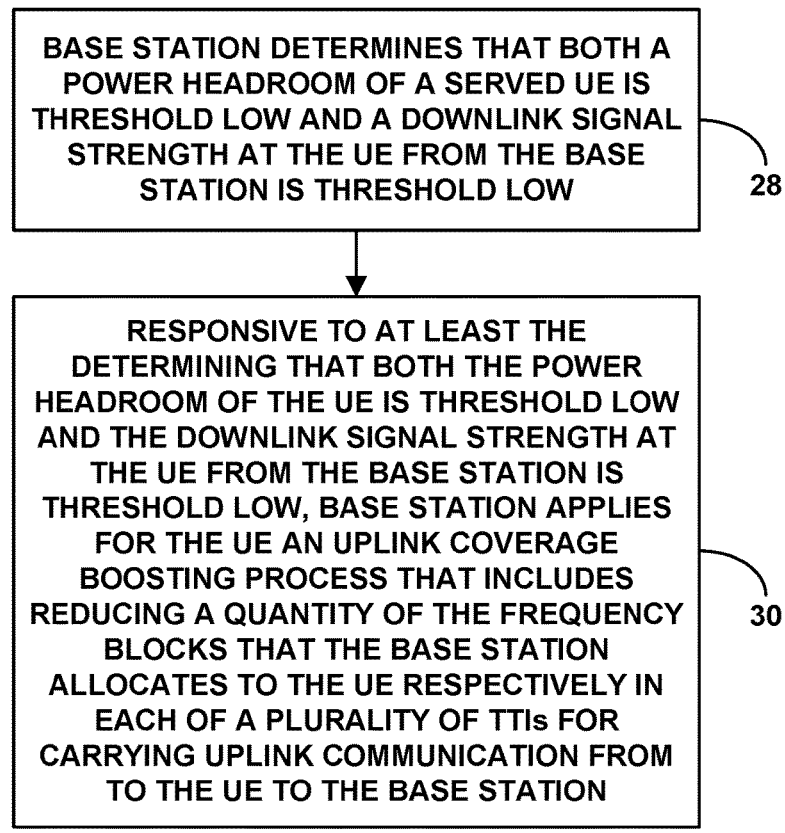
FIG. 2 is a flow chart depicting operations that can be carried out in accordance with the disclosure.

FIG. 2 is next a flow chart depicting a method that could be carried out in accordance with the present disclosure, to control communication from a UE to a base station when the base station is serving the UE over an air interface that defines TTIs and that spans a frequency bandwidth, and where, in each TTI, the frequency bandwidth is divided into discrete frequency blocks (e.g., PRBs) individually allocable by the base station for carrying uplink transmission. This method could be carried out by the base station.

As shown in FIG. 2, at block 28, the method involves the base station determining that both a power headroom of the UE is threshold low and a downlink signal strength at the UE from the base station is threshold low. Further, at block 30, the method involves, responsive to at least the determining that both the power headroom of the UE is threshold low and the downlink signal strength at the UE from the base station is threshold low, the base station applying for the UE an uplink coverage boosting process that includes reducing a quantity of the frequency blocks that the base station allocates to the UE respectively in each of a plurality of the TTIs for carrying uplink communication from to the UE to the base station. The base station could consider other factors as well, such as also requiring that TTI-bundling already be in place for the UE for instance.

In line with the discussion above, the air interface for uplink transmission in this process could be an SC-FDMA air interface, such as an LTE uplink air interface for instance.

Further, the power headroom of the UE could represent a difference between a maximum transmission power of the UE and a currently set transmission power of the UE, and the act of the base station determining that the power headroom of the UE is threshold low could comprise the base station receiving from the UE a report specifying the power headroom of the UE and the base station determining that the power headroom specified by the received report is lower than a predefined threshold level.

Moreover, the downlink signal strength at the UE from the base station could be RSRP or the like, and the act of the base station determining that the downlink signal strength at the UE from the base station is threshold low could comprise the base station receiving from the UE a report specifying the downlink signal strength at the UE from the base station and the base station determining that the specified downlink signal strength at the UE from the base station is lower than a predefined threshold level.

Further in line with the discussion above, the uplink coverage boosting process at issue could be a voice over IP coverage boosting process, such as VUCB, and the method could be carried out in response to a determination by the base station that the UE is engaged in a VoIP call (e.g., based on the UE having an established guaranteed-bit-rate bearer for carrying conversational voice traffic).

In practice, for instance, the UE could transmit a voice packet periodically over the air interface to the base station, and the act of reducing the quantity of the frequency blocks that the base station allocates to the UE respectively in each of plurality of the TTIs for carrying uplink communication from to the UE to the base station could involve the base station transitioning from a first mode in which the base station causes the UE to use MCS for uplink transmission of each voice packet (e.g., per a standard CQI-MCS mapping) to a second mode in which the base station causes the UE to use a second MCS for uplink transmission of each voice packet, the second MCS being higher order than the first MCS so that each voice packet can be transmitted in a reduced quantity of the frequency blocks.

Indeed, regardless of whether voice packet communication is at issue, the act of reducing the quantity of the frequency blocks that the base station allocates to the UE respectively in each of plurality of the TTIs for carrying uplink communication from to the UE to the base station could comprise the base station increasing a modulation order used for the uplink communication so as to accommodate a given quantity of uplink data in a reduced quantity of the frequency blocks. Alternatively, the act of reducing the quantity of the frequency blocks that the base station allocates to the UE respectively in each of plurality of the TTIs for carrying uplink communication from to the UE to the base station could involve distributing allocation of a given quantity of the frequency blocks among an increased quantity of the TTIs.

Figure 3:
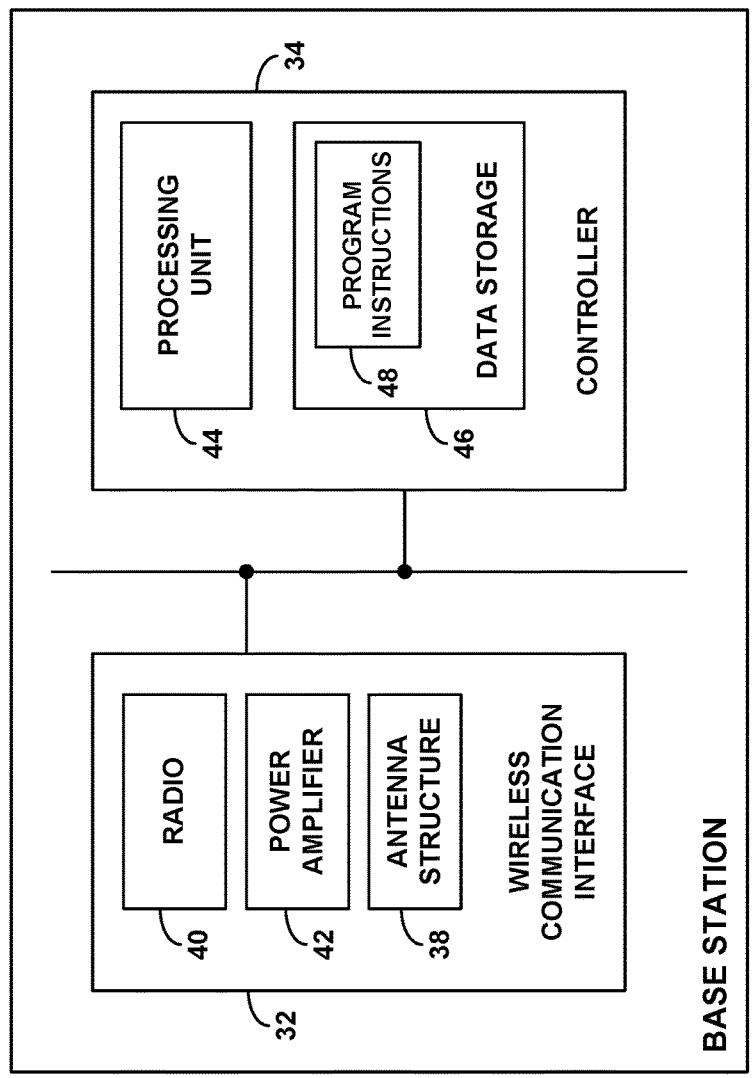
FIG. 3 is a simplified block diagram of a base station operable in an example implementation.

FIG. 3 is next a simplified block diagram of an example base station operable to carry out various features described herein. This base station could generally take any of a variety of forms, including, for instance, a macro base station, a small cell base station, a relay base station, a femto base station, or the like. As shown, the example base station includes a wireless communication interface 32 and a controller 34, shown by way of example interconnected by a system bus, network, or other connection mechanism 36.

The wireless communication interface 32 could include an antenna structure (e.g., a phased array antenna) 38 for transmitting and receiving over an air interface, where the air interface defines TTIs and spans a frequency bandwidth, and where, in each TTI, the frequency bandwidth is divided into discrete frequency blocks individually allocable by the base station for carrying uplink transmission. Further, the wireless communication interface could include a radio 40 and a power amplifier 42, cooperatively functioning to provide uplink transmission via the antenna structure 38 at a particular transmission power level.

Controller 34, which could be integrated with the wireless communication interface, is then configured to control communication from a UE to the base station when the base station is serving the UE over the air interface. In line with the discussion above, for instance, the controller could be configured to carry out operations such as (i) determining that both a power headroom of the UE is threshold low and a downlink signal strength at the UE from the base station is threshold low and (ii) responsive to at least the determining that both the power headroom of the UE is threshold low and the downlink signal strength at the UE from the base station is threshold low, applying, for the UE, an uplink coverage boosting process that includes reducing a quantity of the frequency blocks that the base station allocates to the UE respectively in each of plurality of the TTIs for carrying uplink communication from to the UE to the base station. Namely, the controller could thus cause the base station to carry out operations such as these. Various features discussed above could be applied in this context as well.

In practice, controller 34 could comprise a processing unit (e.g., one or more microprocessors or other types of processors) 44, data storage (e.g., one or more volatile and/or non-volatile non-transitory storage components, such as optical, magnetic, or flash storage) 46, and program instructions 48 stored in the data storage and executable by the processing unit 44 to carry out these or other base station operations. Alternatively, the controller could take other forms.

Exemplary embodiments have been described above. Those skilled in the art will understand, however, that changes and modifications may be made to these embodiments without departing from the true scope and spirit of the invention.

We claim:

1. A method for controlling communication from a user equipment device (UE) to a base station when the base station is serving the UE over an air interface that defines transmission time intervals (TTIs) and that spans a frequency bandwidth, wherein, in each TTI, the frequency bandwidth is divided into discrete frequency blocks individually allocable by the base station for carrying uplink transmission, the method comprising:

determining by the base station that both a power headroom of the UE is threshold low and a downlink signal strength at the UE from the base station is threshold low; and responsive to at least the determining that both the power headroom of the UE is threshold low and the downlink signal strength at the UE from the base station is threshold low, applying by the base station, for the UE, an uplink coverage boosting process that includes reducing a quantity of the frequency blocks that the base station allocates to the UE respectively in each of a plurality of the TTIs for carrying uplink communication from the UE to the base station.

2. The method of claim 1, wherein the air interface for uplink transmission is a Single-Carrier Frequency Division Multiple Access (SC-FDMA) air interface.

3. The method of claim 1, wherein the power headroom of the UE represents a difference between a maximum transmission power of the UE and a currently set transmission power of the UE.

4. The method of claim 1, wherein determining that the power headroom of the UE is threshold low comprises receiving from the UE a report specifying the power headroom of the UE and determining that the power headroom specified by the report is lower than a predefined threshold level.

5. The method of claim 1, wherein determining that the downlink signal strength at the UE from the base station is threshold low comprises receiving from the UE a report specifying the downlink signal strength at the UE from the base station and determining that the specified downlink signal strength at the UE from the base station is lower than a predefined threshold level.

6. The method of claim 1, wherein the uplink coverage boosting process comprises Voice over Long Term Evolution (VoLTE) Uplink Coverage Boosting (VUCB).

7. The method of claim 1, wherein the applying is further responsive to a determination by the base station that the UE is engaged in a voice over Internet Protocol (VoIP) call.

8. The method of claim 7, wherein the UE transmits a voice packet periodically over the air interface to the base station, and wherein reducing the quantity of the frequency blocks that the base station allocates to the UE respectively in each of plurality of the TTIs for carrying uplink communication from to the UE to the base station comprises:
  transitioning from a first mode in which the base station causes the UE to use a first modulation and coding scheme (MCS) for uplink transmission of each voice packet to a second mode in which the base station causes the UE to use a second MCS for uplink transmission of each voice packet, the second MCS being higher order than the first MCS so that each voice packet can be transmitted in a reduced quantity of the frequency blocks.

9. The method of claim 1, wherein reducing the quantity of the frequency blocks that the base station allocates to the UE respectively in each of plurality of the TTIs for carrying uplink communication from to the UE to the base station comprises increasing a modulation order used for the uplink communication so as to accommodate a given quantity of uplink data in a reduced quantity of the frequency blocks.

10. The method of claim 1, the reducing the quantity of the frequency blocks that the base station allocates to the UE respectively in each of plurality of the TTIs for carrying uplink communication from to the UE to the base station comprises distributing allocation of a given quantity of the frequency blocks among an increased quantity of the TTIs.

11. A base station comprising:
  an antenna structure for transmitting and receiving over an air interface, wherein the air interface defines transmission time intervals (TTIs) and spans a frequency bandwidth, wherein, in each TTI, the frequency bandwidth is divided into discrete frequency blocks individually allocable by the base station for carrying uplink transmission;
  a controller configured to control communication from a user equipment device (UE) to the base station when the base station is serving the UE over the air interface, wherein the controller is configured to carry out operations comprising:
    determining that both a power headroom of the UE is threshold low and a downlink signal strength at the UE from the base station is threshold low; and
    responsive to at least the determining that both the power headroom of the UE is threshold low and the downlink signal strength at the UE from the base station is threshold low, applying, for the UE, an uplink coverage boosting process that includes reducing a quantity of the frequency blocks that the base station allocates to the UE respectively in each of a plurality of the TTIs for carrying uplink communication from to the UE to the base station.

12. The base station of claim 11, wherein the air interface for uplink transmission is a Single-Carrier Frequency Division Multiple Access (SC-FDMA) air interface.

13. The base station method of claim 11, wherein the power headroom of the UE represents a difference between a maximum transmission power of the UE and a currently set transmission power of the UE.

14. The base station of claim 11, wherein determining that the power headroom of the UE is threshold low comprises receiving from the UE a report specifying the power headroom of the UE and determining that the power headroom specified by the report is lower than a predefined threshold level.

15. The base station of claim 1, wherein determining that the downlink signal strength at the UE from the base station is threshold low comprises receiving from the UE a report specifying the downlink signal strength at the UE from the base station and determining that the specified downlink signal strength at the UE from the base station is lower than a predefined threshold level.

16. The base station of claim 11, wherein the uplink coverage boosting process comprises Voice over Long Term Evolution (VoLTE) Uplink Coverage Boosting (VUCB).

17. The base station of claim 11, wherein the applying is further responsive to a determination by the controller that the UE is engaged in a voice over Internet Protocol (VoIP) call.

18. The base station of claim 17, wherein the UE transmits a voice packet periodically over the air interface to the base station, and wherein reducing the quantity of the frequency blocks that the base station allocates to the UE respectively in each of plurality of the TTIs for carrying uplink communication from to the UE to the base station comprises:
  transitioning the base station from a first mode in which the base station causes the UE to use a first modulation and coding scheme (MCS) for uplink transmission of each voice packet to a second mode in which the base station causes the UE to use a second MCS for uplink transmission of each voice packet, the second MCS being higher order than the first MCS so that each voice packet can be transmitted in a reduced quantity of the frequency blocks.

19. The base station of claim 11, wherein reducing the quantity of the frequency blocks that the base station allocates to the UE respectively in each of plurality of the TTIs for carrying uplink communication from to the UE to the base station comprises increasing a modulation order used for the uplink communication so as to accommodate a given quantity of uplink data in a reduced quantity of the frequency blocks.

20. The base station of claim 11, wherein the reducing the quantity of the frequency blocks that the base station allocates to the UE respectively in each of plurality of the TTIs for carrying uplink communication from to the UE to the base station comprises distributing allocation of a given quantity of the frequency blocks among an increased quantity of the TTIs.

* * * * *